US009828183B2

(12) United States Patent
Zhang et al.

(10) Patent No.: US 9,828,183 B2
(45) Date of Patent: Nov. 28, 2017

(54) LOCKING DEVICE FOR MATERIAL CONVEYOR AND MATERIAL CONVEYOR HAVING THE SAME

(71) Applicant: DYNAPAC (CHINA) COMPACTION & PAVING EQUIPMENT CO., LTD., Tianjin (CN)

(72) Inventors: Biao Zhang, Tianjin (CN); Jixue Chen, Tianjin (CN)

(73) Assignee: DYNAPAC (CHINA) COMPACTION & PAVING EQUIPMENT CO LTD, Tianjin (CN)

( * ) Notice: Subject to any disclaimer, the term of this patent is extended or adjusted under 35 U.S.C. 154(b) by 0 days.

(21) Appl. No.: 15/514,071

(22) PCT Filed: Nov. 26, 2014

(86) PCT No.: PCT/CN2014/092283
§ 371 (c)(1),
(2) Date: Mar. 24, 2017

(87) PCT Pub. No.: WO2016/045187
PCT Pub. Date: Mar. 31, 2016

(65) Prior Publication Data
US 2017/0305675 A1 Oct. 26, 2017

(30) Foreign Application Priority Data
Sep. 25, 2014 (CN) .......................... 2014 1 0498420

(51) Int. Cl.
*B65G 41/00* (2006.01)
*B65G 21/10* (2006.01)
*E01C 23/088* (2006.01)
*E01C 23/12* (2006.01)

(52) U.S. Cl.
CPC ............ *B65G 21/10* (2013.01); *B65G 41/002* (2013.01); *E01C 23/088* (2013.01); *E01C 23/127* (2013.01)

(58) Field of Classification Search
CPC .................. B65G 41/002; B65G 21/12; B65G 2812/015; B65G 19/287; E01C 23/088
(Continued)

(56) References Cited

U.S. PATENT DOCUMENTS 2,604,201 A * 7/1952 Gleeson ................. B65G 37/00
198/591
2,649,177 A * 8/1953 Anderson .............. B65G 37/00
193/35 J
(Continued)

FOREIGN PATENT DOCUMENTS

CA 2119094 A1 9/1994
CN 201485776 U 5/2010
(Continued)

OTHER PUBLICATIONS

International Search Report for International Application No. PCT/CN2014/092283 dated Apr. 27, 2015.

*Primary Examiner* — James R Bidwell
(74) *Attorney, Agent, or Firm* — Carter, DeLuca, Farrell & Schmidt, LLP (57) ABSTRACT

A locking device for a material conveyor includes a snapping part pivotally connected to a first conveying section or a second conveying section of the material conveyor and capable of pivoting in the pivoting direction of the second conveying section, the snapping part being provided with two hooks; a first post and a second post that are arranged on the second conveying section or the first conveying section not pivotally connected to the snapping part and are used for being matched with the hooks in hooking to fix the relative position of the second conveying section and the
(Continued)

first conveying section when the second conveying section is in a folded or unfolded state; and a first power mechanism used for driving the snapping part to pivot.

14 Claims, 4 Drawing Sheets

(58) Field of Classification Search
USPC .................. 198/313, 584, 588, 592, 861.5
See application file for complete search history.

(56) References Cited

U.S. PATENT DOCUMENTS

| | | | | |
|---|---|---|---|---|
| 4,390,094 A | * | 6/1983 | Schoeneberger | B65G 21/12 198/320 |
| 4,427,105 A | * | 1/1984 | Hawley | B65G 41/002 198/632 |
| 5,662,210 A | * | 9/1997 | Toews | B65G 15/08 198/581 |
| 6,910,586 B2 | * | 6/2005 | McCloskey | B07B 1/005 198/313 |
| 8,066,110 B2 | * | 11/2011 | Antoline | E21F 13/08 198/583 |
| 8,359,695 B2 | * | 1/2013 | Arsenault | E01H 1/042 198/313 |
| 8,424,666 B2 | * | 4/2013 | Berning | B65G 21/14 198/313 |
| 2011/0000761 A1 | * | 1/2011 | Werlinger | B65G 21/14 198/313 |

FOREIGN PATENT DOCUMENTS

| | | |
|---|---|---|
| CN | 202139526 U | 2/2012 |
| CN | 102372152 A | 3/2012 |
| CN | 204112196 U | 1/2015 |
| DE | 2228395 B2 | 7/1974 |

\* cited by examiner

Drawings

LOCKING DEVICE FOR MATERIAL CONVEYOR AND MATERIAL CONVEYOR HAVING THE SAME

CROSS REFERENCE TO RELATED APPLICATIONS

This application is a national stage application of International Application No. PCT/CN2014/092283, filed Nov. 26, 2014, which claims the benefit of and priority to Chinese Patent Application No. 201410498420.7, filed Sep. 25, 2014, the entire contents of each of which are hereby incorporated by reference herein in their entireties.

TECHNICAL FIELD

The present invention relates to a locking device and, more particularly, to a locking device applied to a foldable material conveyor and a material conveyor having the same.

BACKGROUND

Figure 1:
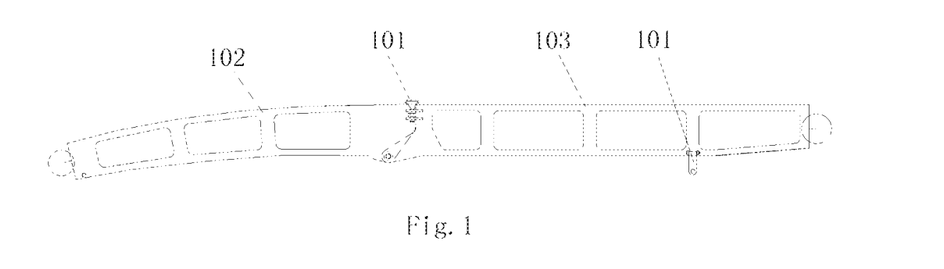
FIG. 1 is a schematic structural view of the material conveyor in the prior art in an unfolded state.
Figure 2:
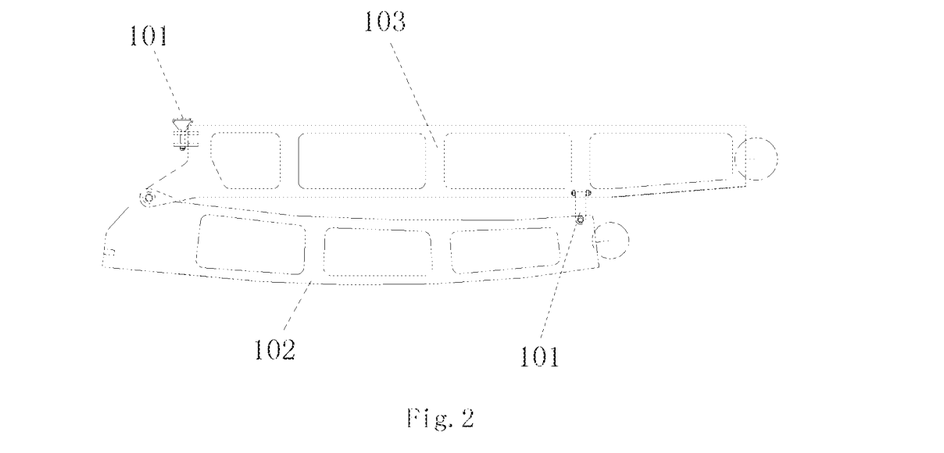
FIG. 2 is a schematic structural view of the material conveyor in the prior art in an folded state.

A milling machine is a main equipment for maintenance and construction of asphalt road surface, and it is mainly used for excavation and renovation of the asphalt concrete surface of highways, urban roads, airports, freight yard and so on, while it can also be used to clear the defects of swelling, oil waves, texture, rut and other defects on the road. The milling machine mainly includes a walking system, a milling device, a frame and a material conveyor. The material conveyor mainly comprises a first conveying section and a second conveying section. When transporting the material conveyor, the material conveyor is generally designed to be foldable in order to reduce the transportation size. When the material conveyor is in operation, the material conveyor is unfolded (i.e., the second conveying section is unfolded), while when transporting the milling machine, the material conveyor is folded (i.e., the second conveying section is folded) to reduce the transportation size. It is necessary to lock the second conveying section after the second conveying section is unfolded or folded. In the prior art, the locking of the second conveying section is generally carried out in the following three ways:

The first way is: as shown in FIGS. 1 and 2, the second conveying section 102 is fixed with the first conveying section 103 by inserting a pin 101 manually or other means after the material conveyor is folded or unfolded. This way is time-consuming, labor-intensive, inefficient, and requires at least one person to do the fixing work near the material conveyor.

The second way is: the pin is controlled by a hydraulic oil cylinder rather than by inserting a pin manually after the material conveyor is unfolded (there is one oil cylinder at each of the two sides of the material conveyor); the fixing is also carried out by inserting a pin manually near the material conveyor or in other ways (e.g. tying the second conveying section to the first conveying section with a belt) after the material conveyor is folded. The disadvantage is: efficiency is relatively low, and when being folded, it is necessary to fix the material conveyor underneath by a person.

The third way is: it is controlled by a hydraulic oil cylinder rather than by inserting a pin manually after the material conveyor is unfolded (there is one oil cylinder at each of two sides of the material conveyor); it is controlled by another set of hydraulic oil cylinder after the material conveyor is folded. The disadvantage is: this way requires four hydraulic oil cylinders, and the cost is relatively high, moreover, the number of hydraulic components is increased, so that the hydraulic piping wiring becomes complex. On the other hand, the increase of the number of the hydraulic oil cylinders lowers the reliability of the system, and even only one of these four hydraulic oil cylinders is out of order, the material conveyor will go out of order.

SUMMARY OF THE INVENTION

In view of the problems in the prior art, the technical problem to be solved by the present invention is to provide a locking device capable of rapidly and effectively fixing the second conveying section of the material conveyor.

In order to solve the above technical problem, the present invention adopts the following technical solution: a locking device for a material conveyor, wherein the material conveyor includes a first conveying section and a second conveying section hinged at the first conveying section by means of a pivoting mechanism, and the locking device for the material conveyor includes:

a snapping part which is pivotally connected to the first conveying section or the second conveying section and capable of pivoting in a direction in which the second conveying section pivots, the snapping part having two hooks;

a first post and a second post which are provided on the second conveying section or the first conveying section to which the snapping part is not pivotally connected and are used to fittingly hook with the two hooks respectively so as to fix the relative position of the second conveying section and the first conveying section when the second conveying section is in a folded or unfolded state with respect to the first conveying section; and a first power mechanism for driving the snapping part to pivot.

Preferably, the snapping part further includes a body and a driving portion, wherein the driving portion and the two hooks are respectively connected to the outer periphery of the body and protrude beyond the outer periphery, and the body is pivotally connected to the first conveying section or the second conveying section;

the first power mechanism is a hydraulic oil cylinder, wherein one end thereof is fixed to the first conveying section or the second conveying section and the other end thereof is pivotally connected to the free end of the driving portion.

Preferably, the body is of a fan shape, and the two hooks are respectively connected to the two ends of the arc of the fan shape, wherein the driving portion is of a link shape and has one end thereof connected at the central angle of the fan shape, and the two hooks and the driving portion are all located in the same plane as the body.

Preferably, the end of the first conveying section opposite to the second conveying section is provided with two opposing first side plates, and the end of the second conveying section opposite to the first conveying section is provided with two opposing second side plates;

the body of the snapping part is pivotally connected to the middle portion of the inner side surface of the first side plate, and extends out of the first conveying section in the direction toward the second conveying section, wherein the first post and the second post are both fixed to the inner side surface of the second side plate corresponding to the first side plate provided with the snapping part, so that the two hooks securely hook with the first post and the second post respectively when the second conveying section is folded or unfolded;

one end of the hydraulic oil cylinder is fixed to the first conveying section.

Preferably, the end of the first conveying section opposite to the second conveying section is provided with two opposing first side plates, and the end of the second conveying section opposite to the first conveying section is provided with two opposing second side plates;

the body of the snapping part is pivotally connected to the middle portion of the inner side surface of the second side plate, and extends out of the second conveying section in the direction toward the first conveying section, wherein the first post and the second post are both fixed to the inner side surface of the first side plate corresponding to the second side plate provided with the snapping part, so that the two hooks securely hook with the first post and the second post respectively when the second conveying section is folded or unfolded;

one end of the hydraulic oil cylinder is fixed to the second conveying section.

Preferably, the pivoting mechanism comprises a second power mechanism, a link and a side link, and the first post is the first pin shaft;

one end of the link is pivotally connected to the outer side surface of the second side plate by the first pin shaft; one end of the side link is pivotally connected with the outer side surface of the first side plate corresponding to the second side plate pivotally connected with the link; the other end of the link and the second power mechanism are respectively pivotally connected to the other end of the side link; the lower end of the first side plate is pivotally connected with the lower end of the second side plate.

Preferably, the first pin shaft is located near the upper end of the second side plate, while the second post is located near the lower end of the second side plate, and the second post is further away from the first conveying section than the first pin shaft.

The present invention also provides a material conveyor comprising the two locking devices for the material conveyor, wherein the two locking devices for the material conveyor being arranged on the first conveying section and the second conveying section.

Compared with the prior art, the beneficial effects of the locking device for the material conveyor and the material conveyor having the same of the present invention lie in: the invention can rapidly and effectively fix the second conveying section by the snapping part and the first power mechanism without additional staff to perform the pin inserting work near the material conveyor, and just one operator can complete the folding and unfolding of the second conveying section on the driving platform, so that the folding and unfolding efficiency of the second conveying section is improved and the labor intensity of the operator is relieved.

| Description of Reference Numerals | |
|---|---|
| 1 - first conveying section | 2 - second conveying section |
| 3 - body | 4 - first power mechanism |
| 5 - first pin shaft | 6 - second pin shaft |
| 7 - third pin shaft | 8 - first hook |
| 9 - second hook | 10 - driving portion |
| 11 - first side plate | 12 - second side plate |
| 13 - second power mechanism | 14 - link |
| 15 - side link | 16- fourth pin shaft |
| 17- fifth pin shaft | |

DETAILED DESCRIPTION

The present invention will be described in further detail with reference to the accompanying drawings and specific embodiments, which should not be construed as limitations of the invention.

As shown in FIGS. 3 to 6, the embodiment of the present invention discloses a locking device for a material conveyor, and the material conveyor includes a first conveying section 1 and a second conveying section 2 hinged at the first conveying section 1 by a pivoting mechanism. The locking device is used to fix the second conveying section 2 by hooking when the second conveying section 2 is in an unfolded or folded state, which leads to simpler operation and higher efficiency.

Continuing with reference to FIGS. 3 to 6, the locking device for the material conveyor of the present invention will be described in detail. The locking device for the material conveyor includes: a snapping part, a first power mechanism 4, a first post and a second post (in the present embodiment, a first pin shaft 5 is taken as an example to describe the first post, and a second pin shaft 6 is taken as an example to describe the second post). The snapping part includes a body 3, a first hook 8, a second hook 9, and a driving portion 10. The first hook 8, the second hook 9 and the driving portion 10 are respectively connected at the outer periphery of the body 3 and protrude from the outer periphery. In the present embodiment, the body 3 is of a fan shape, and the first hook 8 and the second hook 9 are respectively connected to the two ends of the arc of the fan shape, wherein the hook opening directions of the first hook 8 and the second hook 9 are consistent and are oriented in the counter-clockwise direction of the arc of the fan shape. The driving portion 10 is of a link shape and has one end thereof connected at the central angle of the fan shape. The first hook 8 and the second hook 9, and the driving portion 10 in the present embodiment are all located in the same plane as the body 3.

The snapping part is pivotally connected to the first conveying section 1, and in this embodiment, the snapping part is pivotally connected to the first conveying section 1 by means of a third pin shaft 7. In the present embodiment, the first power mechanism 4 employs a hydraulic oil cylinder, wherein the base of the hydraulic oil cylinder is fixed to the first conveying section 1, and the free end of the piston rod of the hydraulic oil cylinder is pivotally connected to the free end of the driving portion 10. The hydraulic oil cylinder, with the extension or retraction of its piston rod, can drive the snapping part to pivot about the third pin shaft 7, and the pivoting direction of the snapping part is the same as the pivoting direction of the second conveying section 2 (that is, the snapping part and the second conveying section 2 pivot in the same or mutually parallel planes). The first pin shaft 5 and the second pin shaft 6 are provided on the second conveying section 2. When the second conveying section 2 is in the folded state, the second hook 9 hooks on the second pin shaft 6 so as to fix the second conveying section 2, maintaining the relative position of the second conveying section 2 and the first conveying section 1 stationary; when the second conveying section 2 is in the unfolded state, the first hook 8 hooks on the first pin shaft 5 so as to fix the second conveying section 2, maintaining the relative position of the second conveying section 2 and the first conveying section 1 stationary.

Figure 4:
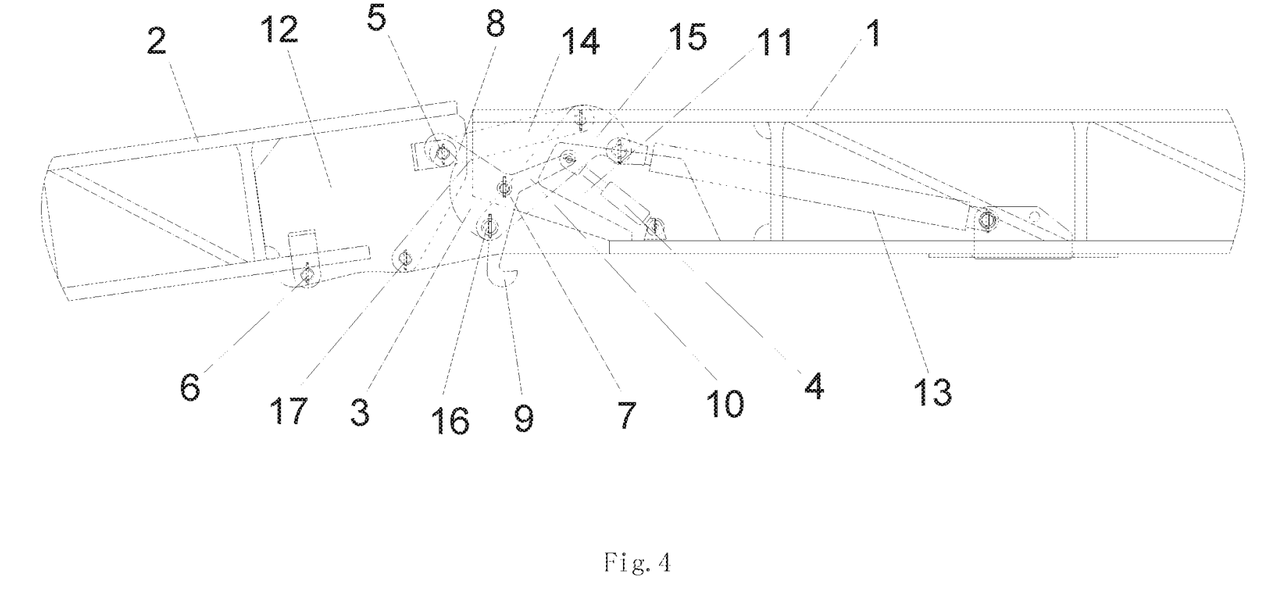
FIG. 4 is a sectional view taken along the line A-A in FIG. 3.
Figure 5:
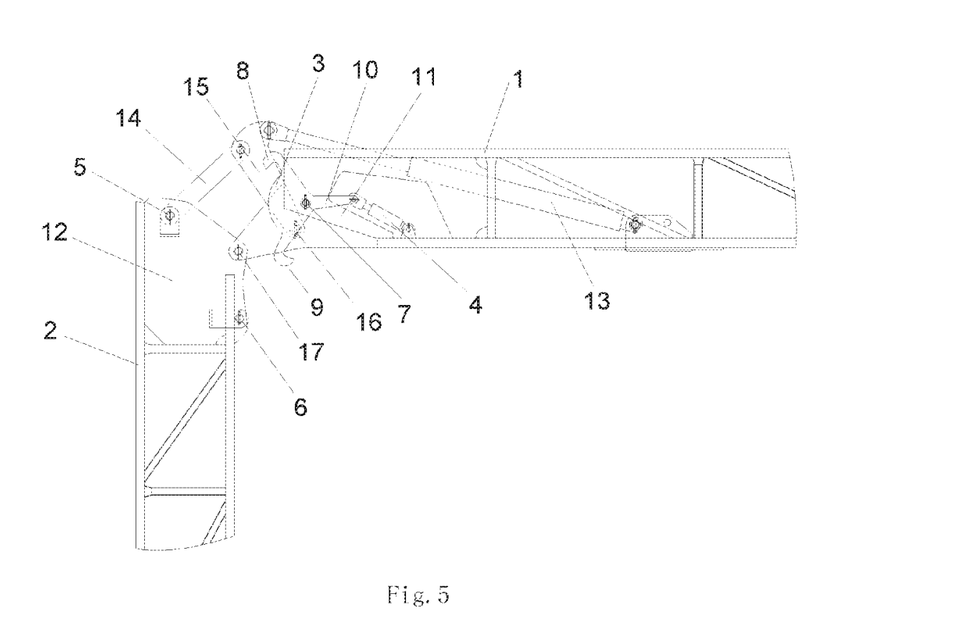
FIG. 5 is a schematic structural view of the material conveyor with the locking device for the material conveyor of the present invention with the second conveying section pivoted 90 degrees.
Figure 6:
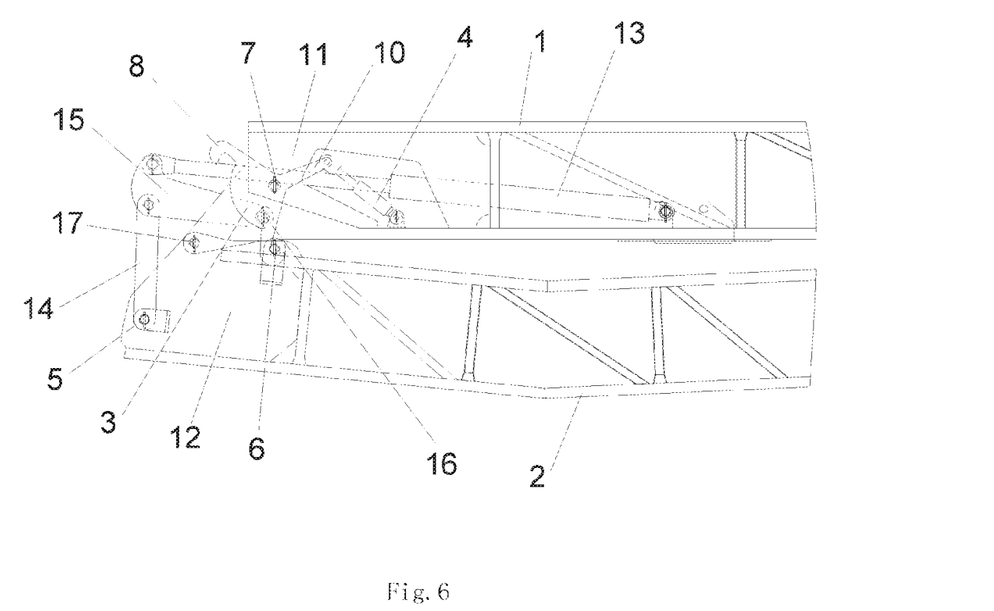
FIG. 6 is a schematic structural view of the material conveyor with the locking device for the material conveyor of the present invention with the second conveying section fully folded.

Continuing with reference to FIGS. 4 to 6, the end of the first conveying section 1 opposite to the second conveying section 2 is provided with two opposing first side plates 11 (only one is shown in the drawing), and the end of the second conveying section 2 opposite to the first conveying section 1 is provided with two opposing second side plates 12 (only one is shown in the drawing); the body 3 of the snapping part is pivotally connected to the middle portion of the inner side surface of the first side plate 11 by means of the third pin shaft 7, and extends out of the first conveying section 1 in the direction toward the second conveying section 2 (see FIG. 4). The first pin shaft 5 and the second pin shaft 6 are both fixed to the inner side surface of the second side plate 12 corresponding to the first side plate 11 provided with the snapping part. The first pin shaft 5 is located near the upper end of the second side plate 12, while the second pin shaft 6 is located near the lower end of the second side plate 12, and the second pin shaft 6 is farther away from the first conveying section 1 than the first pin shaft 5.

As shown in FIGS. 3 to 6, the pivoting mechanism includes a second power mechanism 13, a link 14, and a side link 15. One end of the link 14 is pivotally connected to the outer side surface of the second side plate 12 by the first pin shaft 5. That is, the first pin shaft 5 is not only the pivot for pivotally connecting the link 14 to the second side plate 12, but also a fixture for fixing the first hook 8. One end of the side link 15 is pivotally connected to the outer side surface of the first side plate 11 by a fourth pin shaft 16; the other end of the link 14 and the second power mechanism 13 are pivotally connected to the other end of the side link 15 respectively (the pivotally connecting positions are different); the lower end of the first side plate 11 and the lower end of the second side plate 12 are pivotally connected through a fifth pin shaft 17. The second conveying section 2 can rotate about the first conveying section 1 with the driving of the second power mechanism 13, achieving the unfolding or folding of the second conveying section 2. In the present embodiment, the second power mechanism 13 employs an oil cylinder.

Operation of the locking device for the material conveyor of the present invention will be described with reference to FIGS. 3 to 6:

As shown in FIG. 4, the piston rod of the second power mechanism 13 is retracted so as to pull the side link 15 to rotate about the fourth pin shaft 16 clockwise, which makes the side link 15 to move towards the first conveying section 1 together with the link 14, while the link 14 pulls the second conveying section 2 to rotate by taking the fifth pin shaft 17 as the pivot, making the second conveying section 2 unfold to have the state shown in FIG. 4, and at this time, the first power mechanism 4 is activated so that the piston rod thereof protrudes, pushing the snapping part to rotate about the third pin shaft 7 counterclockwise until the first hook 8 is hooked on the first pin shaft 5, thus, the second conveying section 2 is locked and the unfolding work of the second conveying section 2 is completed. The operation is very convenient, and the working efficiency is improved.

When it is necessary for the second conveying section 2 to convert into the folded state from the unfolded state, firstly the first power mechanism 4 is activated so as to retract the piston rod thereof; driving the body 3 to rotate clockwise about the third pin shaft 7, so that the first hook 8 disconnects from the first pin shaft 5, and in this way the snapping part is in an unlocked position. As shown in FIG. 5, the piston rod of the second power mechanism 13 extends out, pushing the side link 15 to rotate counterclockwise, and the side link 15 drives the rod 14 to push the second conveying section 2 to rotate with the fifth pin shaft 17 as the pivot until rotating to the state shown in FIG. 6, while the second conveying section 2 is in the folded state and the first power mechanism 4 is activated again so that the piston rod thereof extends out, pushing the snapping part to rotate counterclockwise about the third pin shaft 7 until the second hook 9 hooks on the second pin shaft 6, thus, the second conveying section 2 is locked and the folding work of the second conveying section 2 is completed. In this way the operation is very convenient, and the working efficiency is improved.

With the pivoting mechanism of the first conveying section 1 and the second conveying section 2, the second conveying section 2 can be held in the locked position even during the decompression of the oil cylinder as the first power mechanism 4 or during the replacement of the snapping part.

It can be known from the above description, by only using two power mechanisms, the present invention enables the rapid and effective locking of the second conveying section 2 without the need for additional staff to wait for work near the material conveyor, and just one operator can complete such work on the driving platform, thereby, the production efficiency is unproved, and the work intensity of workers is lowered.

The embodiment described above is described by way of an example in which the snapping part is provided on the first conveying section 1 while the first pin shaft 5 and the second pin shaft 6 are provided on the second conveying section 2. Of course, it can absolutely achieve the locking purpose in the present invention with the snapping part provided on the second conveying section 2 while the first pin shaft 5 and the second pin shaft 6 provided on the first conveying section 1. A person skilled in the art can easily realize the exchange of the position of the snapping part with that of the first pin shaft 5 and the second pin shaft 6 according to the description of the above embodiment, therefore, such structure is not described in detail here.

Alternatively, by replacing the first and second posts with hooks and replacing the first hook 8 and the second hook 9 with posts correspondingly, it is also possible to realize the hooking of them so as to lock the second conveying section 2 at the time when the second conveying section 2 is folded or unfolded.

The first power mechanism 4 and the second power mechanism 13 according to the present invention can employ other power mechanisms in addition to employing the oil cylinders described in the above embodiments, as long as they can respectively drive the snapping part and the second conveying section 2 to pivot. Further, the shape of the snapping part is not limited to the structure described above, for example, the body 3 may be a triangle, a rectangle and the like in addition to a fan shape. It is also feasible to remove the body 3 and fixedly connect one end of the first hook 8, one end of the second hook 9 and one end of the driving portion 10 together and pivotally connect them at one point. The body 3 is not limited to a sheet, but may have a certain thickness, such as a block shape.

It can he known from the above description, the present invention mainly utilizes a part having two hooks and two rod-like bodies (the first pin shaft 5 and the second pin shaft 6). By hooking one hook and one rod-like body, the second conveying section 2 is fixed when the second conveying section 2 is unfolded, while by hooking the other hook with the other rod-like body, the second conveying section 2 is fixed when the second conveying section 2 is folded. So it is very convenient to fix when the second conveying section 2 is unfolded or folded, saving manpower and improving work efficiency.

Each pin shaft (the first pin shaft 5, the second pin shaft 6, the third pin shaft the fourth pin shaft 16 and the fifth pin shaft 17) mentioned in the present invention can be fixed by hinged connection, but it can also be fixed by welding.

Figure 3:
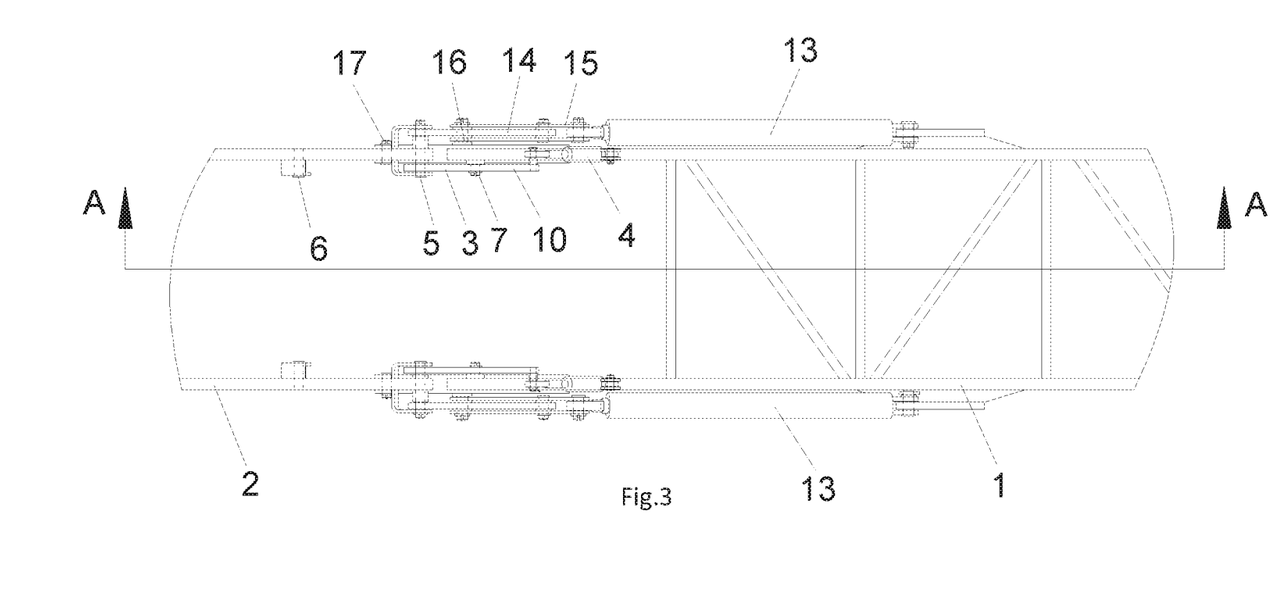
FIG. 3 is a schematic top view of a partial structure of the material conveyor with a locking device for the material conveyor of the present invention.

The present invention also discloses a material conveyor, and as shown in FIG. 3, the material conveyor includes the two above-mentioned locking devices for the material conveyor, wherein the two locking devices are symmetrically arranged on the material conveyor. Specifically, continuing with reference to FIGS. 3 to 6, the snapping part of one of the locking devices is pivotally connected to the inner side surface of one of the first side plates 11, while the snapping part of the other locking device is pivotally connected to the inner side surface of the other first side plate 11, and these two snapping parts are corresponding to each other. The first pin shaft 5 and the second pin shaft 6 of one of the locking devices are provided on the inner surface of one of the second side plates 12, while the first pin shaft 5 and the second pin shaft 6 of the other locking device are provided on the inner surface of the other second side plate 12. The first power mechanism 4 of one of the locking devices is provided on the first conveying section 1 and is located at the inside of one of the first side plates 11, while the first power mechanism 4 of the other locking device is provided on the first conveying section 1 and is located at the inside of the other first side plate 11, so that the first power mechanisms 4 of the two locking devices are both provided on the first conveying section 1 and are respectively near the two first side plates 11.

The second power mechanisms 13 of the two pivoting mechanisms are located at the outside of the two first side plates 11 respectively, while both the link 14 and the side link 15 are located at the outside of the first side plate 11 and the second side plate 12, and the specific position relationship can be seen in FIG. 3. Of course, it is also possible to provide the second power mechanism 13, the link 14, and the side link 15 inside the first side plate 11 and the second side plate 12, but such arrangement leads to larger volume and uncompact structure of the first conveying section 1 and the second conveying section 2.

The above embodiments are merely exemplary embodiments of the present invention and are not intended to limit the present invention, while the protection scope of the invention is defined by the claims. Various modifications or equivalent substitutions may be made to the present invention within the spirit and scope of the invention by those skilled in the art, and such modifications or equivalent substitutions are considered to fall within the scope of the present invention.

The invention claimed is:

1. A locking device for a material conveyor, the material conveyor comprising:
   a first conveying section; and
   a second conveying section hinged at the first conveying section by a pivoting mechanism,
the locking device for the material conveyor comprising:
   a snapping part which is pivotally connected to the first conveying section or the second conveying section and capable of pivoting in a direction in which the second conveying section pivots, the snapping part having two hooks;
   a first post and a second post which are provided on the second conveying section or the first conveying section to which the snapping part is not pivotally connected and are used to fittingly hook with the two hooks respectively so as to fix a relative position of the second conveying section and the first conveying section when the second conveying section is in a folded or unfolded state with respect to the first conveying section; and
   a first power mechanism for driving the snapping part to pivot.

2. The locking device for a material conveyor according to claim 1,
   wherein the snapping part further includes a body and a driving portion, wherein the driving portion and the two hooks are respectively connected to an outer periphery of the body and protrude beyond the outer periphery, and the body is pivotally connected to the first conveying section or the second conveying section, and
   wherein the first power mechanism is a hydraulic oil cylinder, wherein one end thereof is fixed to the first conveying section or the second conveying section and an other end thereof is pivotally connected to a free end of the driving portion.

3. The locking device for a material conveyor according to claim 2,
   wherein the body is of a fan shape, and the two hooks are respectively connected to two ends of an arc of the fan shape, and
   wherein the driving portion is of a link shape and has one end thereof connected at a central angle of the fan shape, and the two hooks and the driving portion are all located in a same plane as the body.

4. The locking device for a material conveyor according to claim 3,
   wherein an end of the first conveying section opposite to the second conveying section is provided with two opposing first side plates, and an end of the second conveying section opposite to the first conveying section is provided with two opposing second side plates,
   wherein the body of the snapping part is pivotally connected to a middle portion of an inner side surface of a first side plate, and extends out of the first conveying section in a direction toward the second conveying section,
   wherein the first post and the second post are both fixed to an inner side surface of a second side plate corresponding to the first side plate provided with the snapping part, so that the two hooks securely hook with the first post and the second post respectively when the second conveying section is folded or unfolded, and wherein one end of the hydraulic oil cylinder is fixed to the first conveying section.

5. The locking device for a material conveyor according to claim 3, wherein an the end of the first conveying section opposite to the second conveying section is provided with two opposing first side plates, and an end of the second conveying section opposite to the first conveying section is provided with two opposing second side plates, wherein the body of the snapping part is pivotally connected to a middle portion of an inner side surface of a second side plate, and extends out of the second conveying section in a direction toward the first conveying section, wherein the first post and the second post are both fixed to an inner side surface of a first side plate corresponding to the second side plate provided with the snapping part, so that the two hooks securely hook with the first post and the second post respectively when the second conveying section is folded or unfolded, and wherein one end of the hydraulic oil cylinder is fixed to the second conveying section.

6. The locking device for a material conveyor according to claim 4, wherein the pivoting mechanism comprises a second power mechanism, a link and a side link, and the first post is a first pin shaft, and wherein one end of the link is pivotally connected to an outer side surface of the second side plate by the first pin shaft; one end of the side link is pivotally connected with an outer side surface of the first side plate corresponding to the second side plate pivotally connected with the link; an other end of the link and the second power mechanism are respectively pivotally connected to an other end of the side link; a lower end of the first side plate is pivotally connected with a lower end of the second side plate.

7. The locking device for a material conveyor according to claim 6, wherein the first pin shaft is located near an upper end of the second side plate, while the second post is located near the lower end of the second side plate, and the second post is further away from the first conveying section than the first pin shaft.

8. A material conveyor comprising at least two locking devices for the material conveyor according to claim 1 arranged on the first conveying section and the second conveying section.

9. A material conveyor comprising at least two locking devices for the material conveyor according to claim 2 arranged on the first conveying section and the second conveying section.

10. A material conveyor comprising at least two locking devices for the material conveyor according to claim 3 arranged on the first conveying section and the second conveying section.

11. A material conveyor comprising at least two locking devices for the material conveyor according to claim 4 arranged on the first conveying section and the second conveying section.

12. A material conveyor comprising at least two locking devices for the material conveyor according to claim 5 arranged on the first conveying section and the second conveying section.

13. A material conveyor comprising at least two locking devices for the material conveyor according to claim 6 arranged on the first conveying section and the second conveying section.

14. A material conveyor comprising at least two locking devices for the material conveyor according to claim 7 arranged on the first conveying section and the second conveying section.

* * * * *